B. I. WILLIAMS.
Flat-Iron Heaters.

No. 149,174. Patented March 31, 1874.

Witnesses
Orville N. Fuller
Seymour Foster

Inventor
Benjamin I. Williams

UNITED STATES PATENT OFFICE.

BENJAMIN I. WILLIAMS, OF LANSING, MICHIGAN.

IMPROVEMENT IN FLAT-IRON HEATERS.

Specification forming part of Letters Patent No. 149,174, dated March 31, 1874; application filed November 15, 1873.

*To all whom it may concern:*

Be it known that I, BENJAMIN I. WILLIAMS, of Lansing, in the county of Ingham and State of Michigan, have invented certain Improvements in Flat-Iron Heaters, of which the following is a specification:

My invention relates to the combination of a pan and cover in such a manner as to inclose the flat-iron within a heater, thereby causing it to heat a great deal quicker and with less fuel. The handle of the flat-iron, projecting through and above the cover, is heated less, therefore more easily handled.

Figure 1:
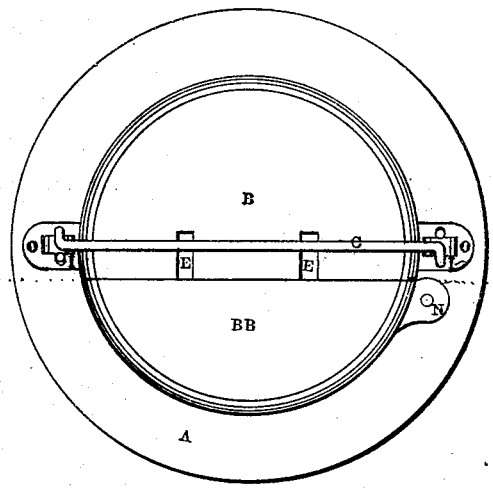
Figure 2:
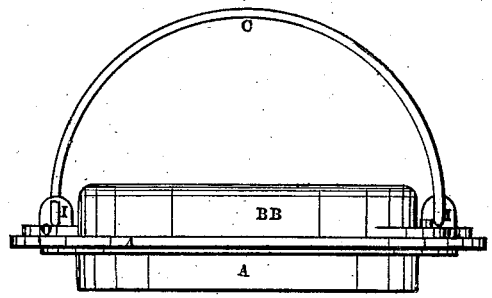
Figure 3:
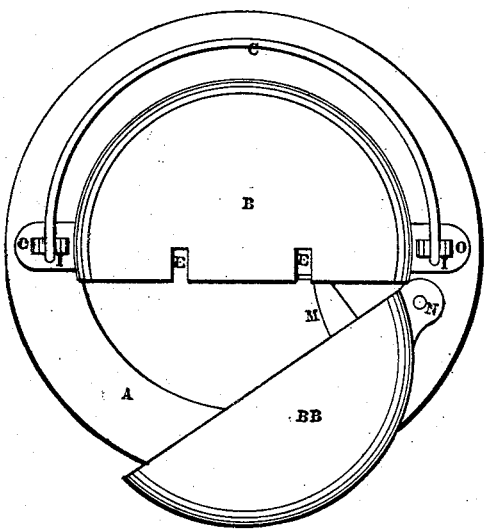
Figure 4:
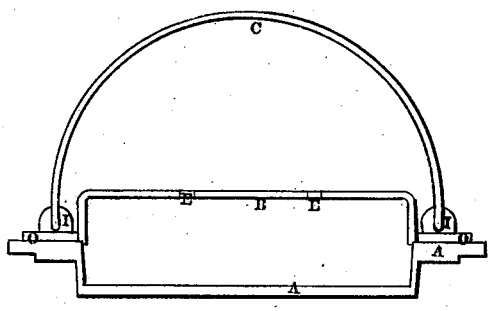

Figure 1 is a top view of a sad-iron heater complete, embodying my invention. Fig. 2 is a side view of the same. Fig. 3 is a top view with the bail C turned down and the movable portion of the cover B B open, ready to receive the flat-iron to be heated. Fig. 4 is a vertical sectional view on dotted line in Fig. 1.

A is the bottom pan, which will sit in the griddle-hole of a common stove. B is the immovable portion of the cover, and B B the movable portion, which turns on pin at N. I I are ears attached to and projecting upward from the flange of pan A, and to which the bail C is attached. O O are ears attached to B, and holding it in place by having elongated holes to admit I I through them before putting the bail C in. E E are slots in the edge of B, to receive the handle of flat-iron and to allow the closing of B B. M is a plate attached to the under side of B B, projecting out and passing under B, having a hook on the end for the handle of flat-iron to catch against and close B B as it is shoved into the slots E E. C is a bail for lifting the entire device.

I claim as my invention—

The combination of the pan A, with its covers B and B B, slots E E, and plate M, substantially as and for the purpose hereinbefore set forth.

BENJAMIN I. WILLIAMS.

Witnesses:
 ORVILLE V. FULLER,
 SEYMOUR FOSTER.